July 14, 1931.  L. H. HILL  1,813,996
EQUIPMENT FOR CHANGING TAPS OF ELECTRICAL APPARATUS
Filed June 29, 1928  4 Sheets-Sheet 1

INVENTOR
Leland H. Hill.
ATTORNEY

July 14, 1931.  L. H. HILL  1,813,996

EQUIPMENT FOR CHANGING TAPS OF ELECTRICAL APPARATUS

Filed June 29, 1928  4 Sheets-Sheet 2

INVENTOR
Leland H. Hill.
BY
ATTORNEY

July 14, 1931.  L. H. HILL  1,813,996
EQUIPMENT FOR CHANGING TAPS OF ELECTRICAL APPARATUS
Filed June 29, 1928  4 Sheets-Sheet 3

INVENTOR
Leland H. Hill.
BY
ATTORNEY

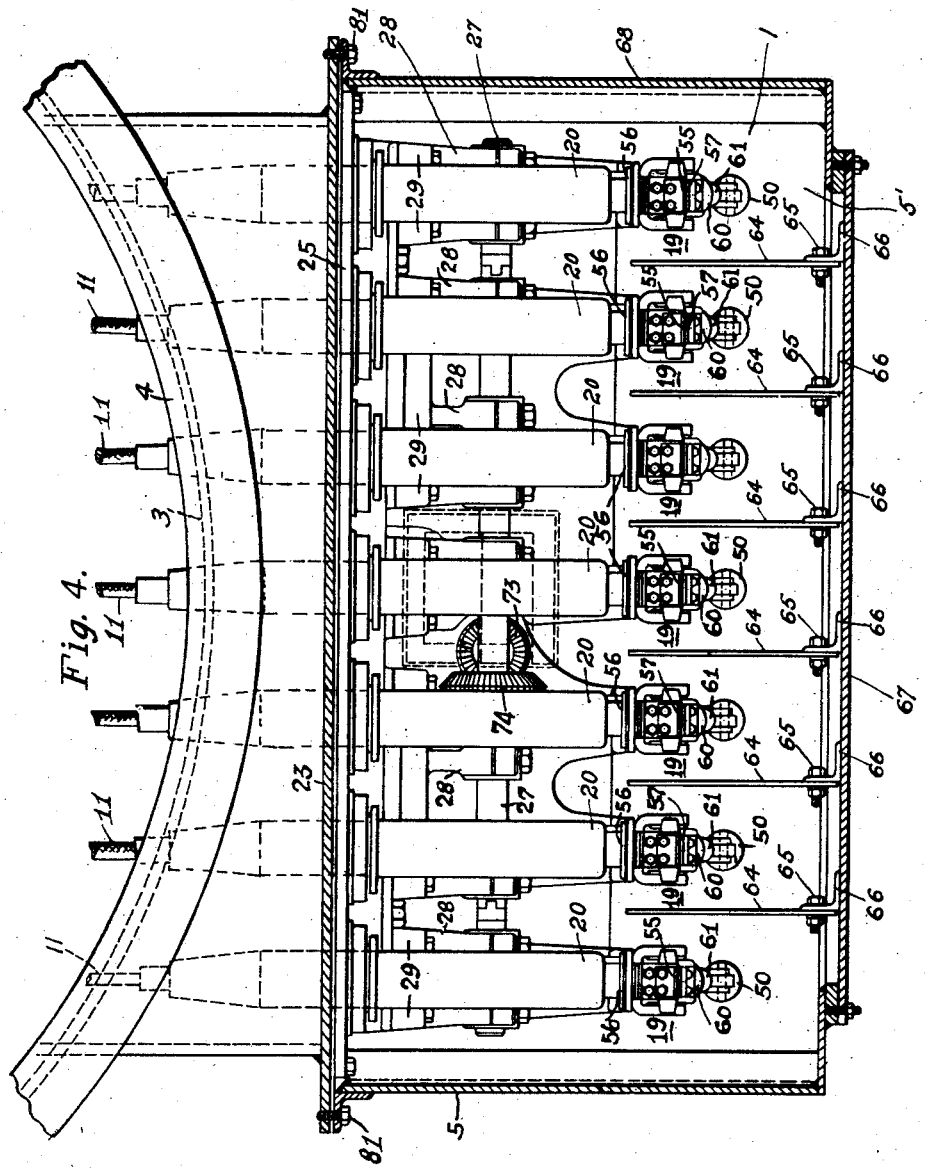

Patented July 14, 1931

1,813,996

UNITED STATES PATENT OFFICE

LELAND H. HILL, OF COLLINGSWOOD, NEW JERSEY, ASSIGNOR TO WESTINGHOUSE ELECTRIC & MANUFACTURING COMPANY, A CORPORATION OF PENNSYLVANIA

EQUIPMENT FOR CHANGING TAPS OF ELECTRICAL APPARATUS

Application filed June 29, 1928. Serial No. 289,193.

My invention relates to equipment for changing taps of electrical apparatus and is particularly adapted to automatic equipment for changing transformer taps under load.

My invention has for an object to provide means for improving the construction, efficiency and cost of equipment for changing transformer taps.

Another object of my invention is to more intimately combine the tap-changing equipment and the transformer with which such equipment is used, to thereby decrease the length of the conductors that connect the switches of the tap-changing mechanism with the taps on the winding of the transformer.

A still further object of my invention is to decrease the amount of equipment required for the operation of a number of circuit breakers and their attendant equipment, by mounting the switches directly on the terminal bushings that are, in accordance with my invention, mounted in the transformer casing.

In general, I accomplish the above and other useful and desirable objects that will be deducible from, or pointed out in, the following description by mounting a plate on the wall of a transformer casing which acts as a support for terminal bushings. Such bushings house the conductors from the taps of the windings to the tap-changing switches that are, in turn, mounted directly on the outer ends of said terminal bushings. The mechanism for operating the switches is mounted directly below the terminal bushings, and both the switches and switch-operating mechanism are mounted in an oil-tight chamber that is secured to the plate in the tank wall. A shaft is provided that extends between a motor-operated mechanism mounted on the tank directly below such oil-tight tap-changing switch chamber. It is to be here noted that, in accordance with my invention, the tap changer may either be mounted upon the transformer-tank wall to make an integral unit with the transformer, thereby necessitating the assembly of the tap changer with the transformer, or the tap changer may be mounted, as an integral unit, on a plate, that is, in turn, mounted on the transformer-tank wall.

In the drawings, Figure 1 is a view, partially in section and partially in side elevation of tap-changing equipment constructed in accordance with my invention and mounted on the side of a transformer tank.

Fig. 4 is a plan view of the tap-changing equipment shown in Fig. 3.

Fig. 5 is a schematic diagram showing the connection of the tap-changing switches to the windings of the preventive auto-transformer and to the main transformer.

Figure 1:
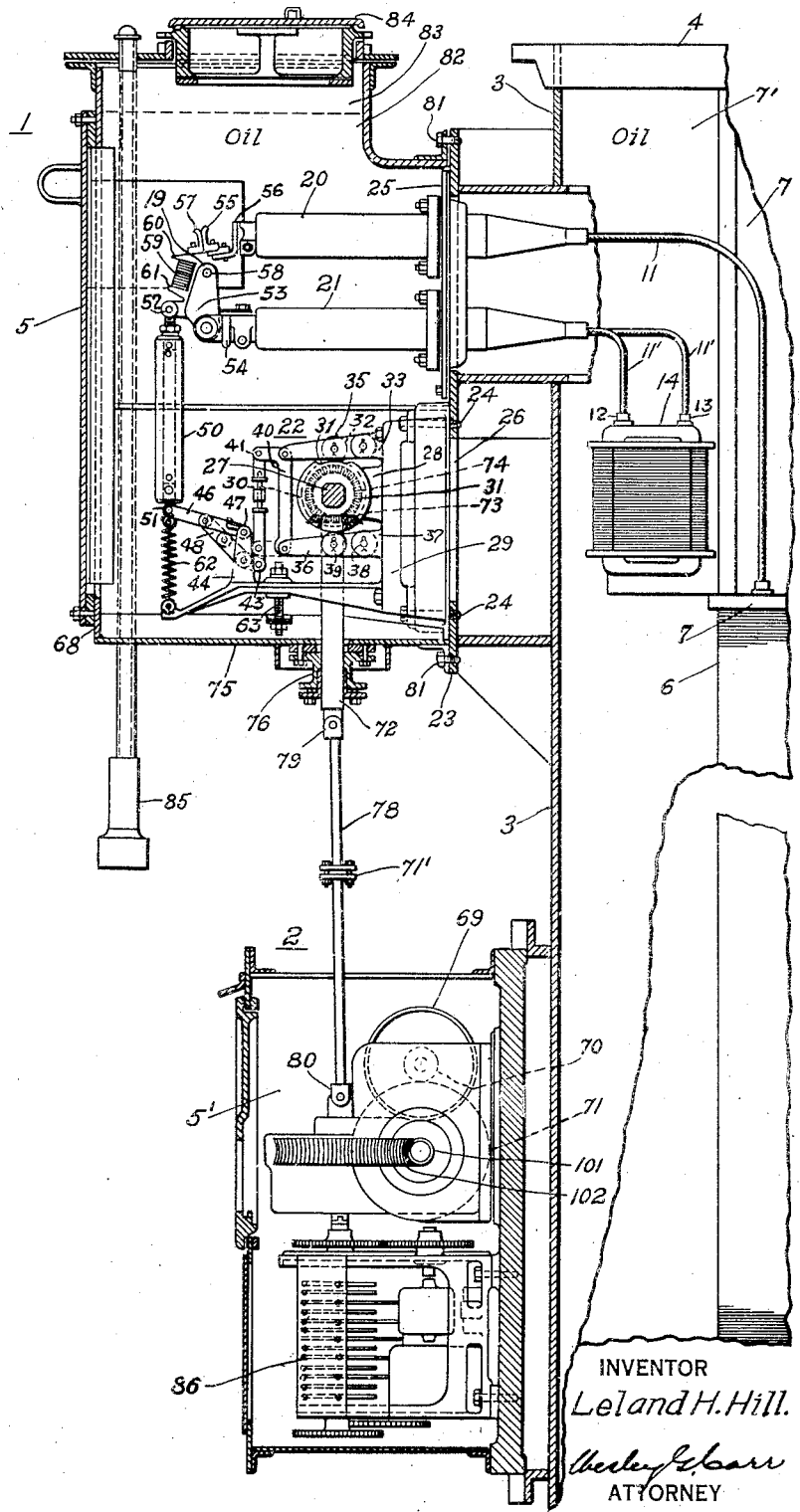

The tap-changing equipment illustrated in the drawings may be conveniently divided into the switch mechanism 1 and control mechanism 2 that are respectively mounted, in an upper compartment 5 and in a lower compartment 5', on the wall 3 of the tank 4 of a transformer. The transformer, in the present instance, is of the oil-immersed, self-cooled type and comprises a transformer core 6 and coils 7 completely immersed in a cooling and insulating fluid 7', such as oil. The transformer may be of the conservator type, which includes an auxiliary tank (not shown), containing the same fluid as the main tank 4, mounted above the transformer tank 4 and having a communicating-pipe connection with the latter to maintain it completely filled with the insulating fluid. It will be apparent to those skilled in the art that my invention is equally applicable to transformers of other types, such as those having cushions of air or other gas in the transformer tank above the oil.

In order to effect a transition from one voltage to another by means of tap-changing switches, one of the windings of the transformer—in this instance, the high-voltage winding 10, Fig. 5,—is provided with a plurality of taps 11 that are connected through switches 19, and alternately, by means of conductors 15 and 16, respectively, to opposite terminals 12 and 13 of a preventive autotransformer 14. Terminal conductors 17 and 18 lead to the high-voltage circuit of the transmission line or to one conductor of a transmission line and neutral.

In a preferred embodiment of my invention, the switches 19 are mounted directly on terminal bushings 20 and 21 (Figs. 1 and 2) that are mounted on the side wall 3 of the transformer casing 4.

The terminal bushings 20 and 21 are preferably of the condenser type and constitute means for insulating the conductors 11 and 11′ from the wall 3 of the transformer tank 4. The conductors 11 of the upper terminal bushings 20 are connected to the taps in the high-voltage winding 10 of the transformer. The conductors 11′ of the lower terminal bushings 21 are alternately connected to opposite terminals 12 and 13 of the preventive auto transformer 14, through conductors 15 and 16, respectively.

While the condenser bushings 20 and 21 may be mounted directly on the wall 3 of the transformer casing 4, as pointed out above, a desirable construction for mounting the bushings in the wall of the transformer tank, in connection with a cam-operated mechanism 22, is shown in the drawings. In the assembly illustrated, a supporting structure 23 is mounted on the side 3 of the transformer tank 4 to support the cam operating mechanism 22, by any suitable means, such as bolts 24. The bushings 20 and 21 are preferably mounted on a supporting plate or panel 25 in practically the same vertical plane as the base 26 of the cam operating mechanism 22. The cam operating mechanism is provided with a shaft 27 that extends horizontally, substantially throughout the length of the compartment 5 occupied by the tap-changing mechanism 1. The shaft 27 is journalled in bearings 28 that are supported on a base 29, which is mounted on the base 26. A plurality of pairs of cams 30 and 31, one pair for each of the switches 19, are provided on the shaft 27 for opening and closing the switches 19 in a predetermined sequence.

Figure 2:
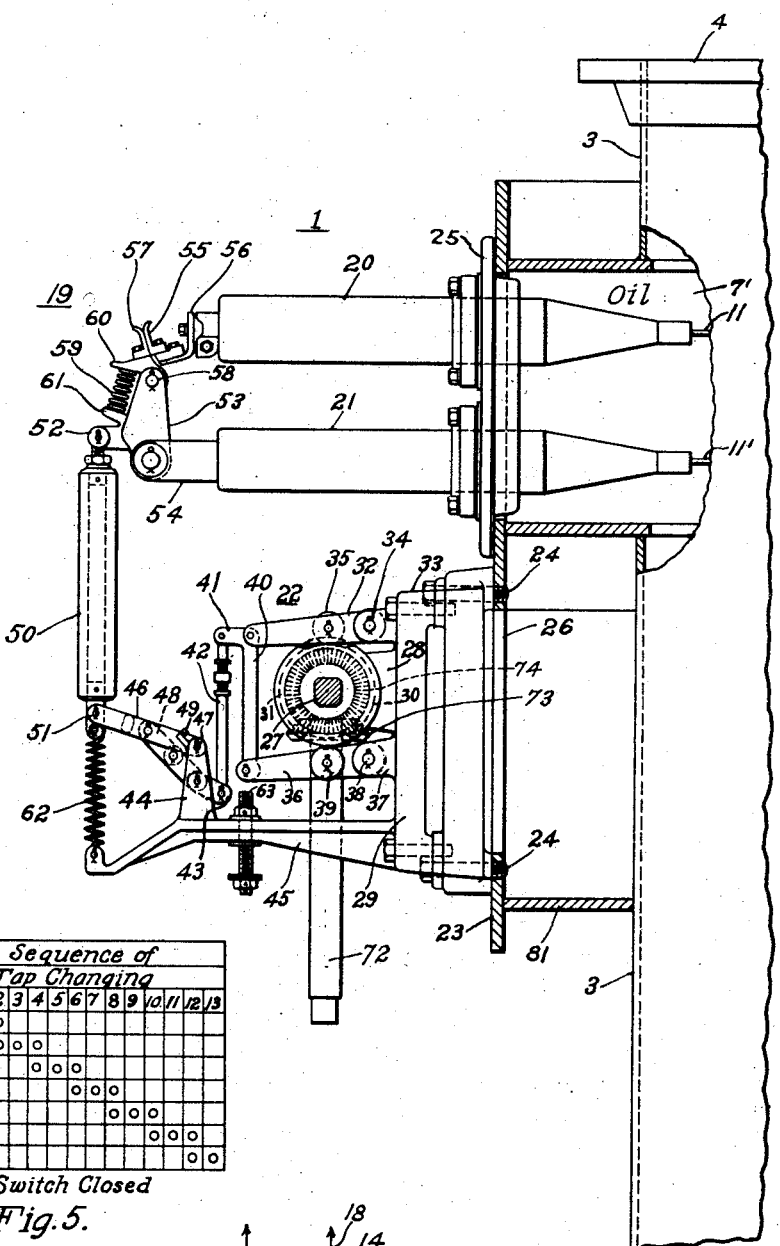
Fig. 2 is an enlarged view, similar to Fig. 1, of the tap-changing mechanism shown therein, the oil chamber being removed.
Figure 3:
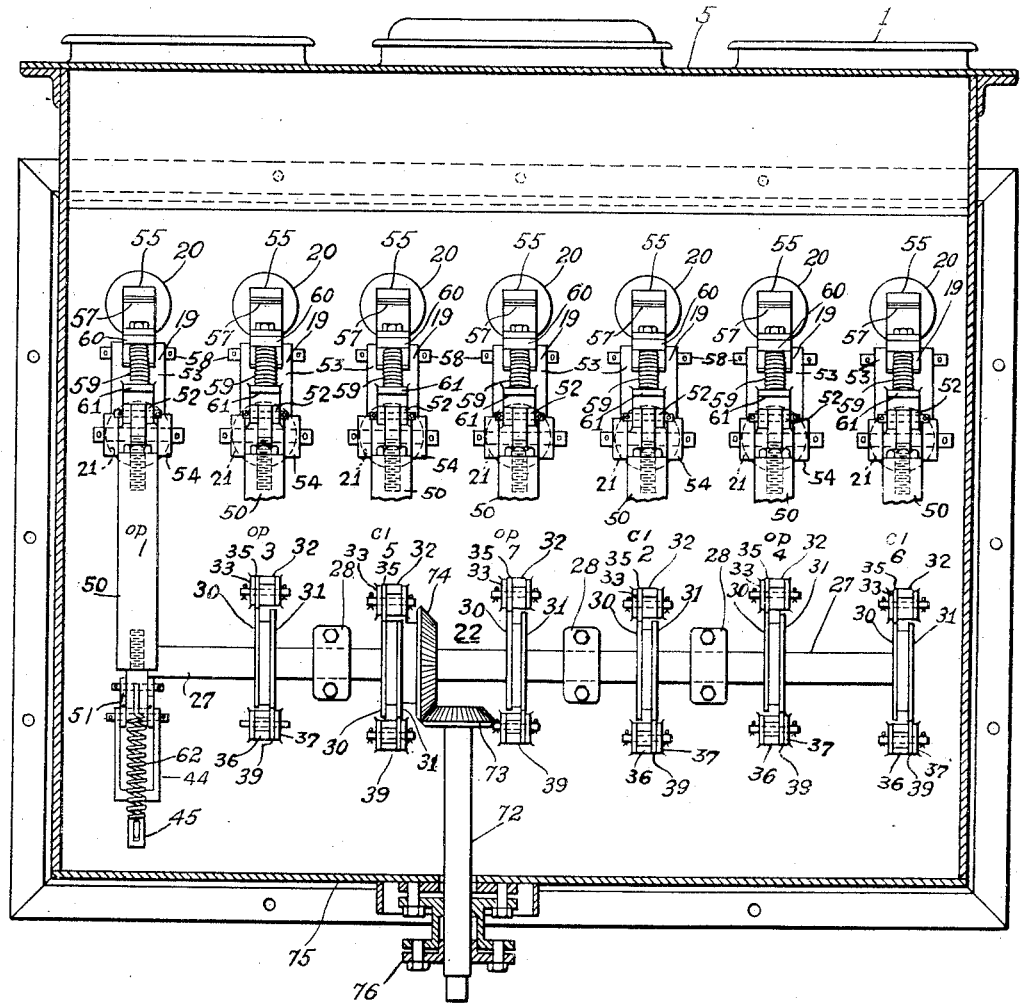
Fig. 3 is a view, partially in section and partially in front elevation, of the tap-changing switches shown in Fig. 1.

The cams 30 (see Figs. 2 and 3) actuate rollers 35, carried by lever arms 32, that are pivotally mounted, at points 34, on brackets 33 extending from the base 29. In a similar manner, the cams 31 actuate rollers 39 and lever arms 36, that are pivoted, at points 38, to brackets 37 extending from the base 29. The lever arms 32 and 36 are connected by a link 40 that is pivoted, at its ends, to the outer portions of the levers. The link 40 is provided with an extension 41 to which is pivoted an adjustable link 42. The link 42 is pivoted to a bell-crank lever arm 43 that is supported by a bracket 44 extending vertically from a bracket 45 on the base 29. A lever 46 is pivoted to the bracket 44 at the point 47. A link 48 is provided, having one end pivotally attached to the lever 46 at a point near its center, and the other end pivotally attached to one end of the lever arm 43. The lever arm 43, the member 46 and the short link 48 constitute a toggle, the motion of which is limited, in one direction, by an adjustable screw stop 49 mounted on the stationary bracket 44.

An electrically insulating connecting member 50, that is preferably a hollow micarta rod, connects the end 51 of the lever 46 to an operating lever 52 of the switch 19. The switch 19 comprises a contact-carrying member 53 which is preferably pivoted to the terminal 54 of the conductor 11′ in the terminal bushing 21. One contact member 55 of the switch 19 is mounted on the terminal 56 of the upper condenser bushing 20. The other contact member 57 is pivotally mounted in the end of the contact-carrying member 53, at 58, and a spring 59 is provided between an extension 60 of the contact member 57 and an extension 61 of the member 53, to bias the contact member 57 about the pivot point 58 and provide a rolling action of the contact member 57, upon operation of the switch 19. A spring 62 is provided between the end of the lever 46 and the bracket 45 to aid gravity in separating the contact members 55 and 57, when the toggle mechanism is operated. The spring 59 and gravity both aid in opening the switch 19.

In case of any tendency of the contact members 55 and 57 to stick, a forced opening is assured by continued rotation of the cam shaft, to force the link 42 up and the rod 50 in a downward direction, thereby opening the switch 19 before another switch 19 can start to close. An adjustable screw stop 63 is mounted on the bracket 45 for limiting the downward motion of the link 40.

Insulating barriers 64, that preferably comprise plates of micarta, or similar material, are mounted between the switches 19, by means of bolts 65 and elbows 66 suitably welded to the front plate of the chamber 68 that encloses the switching mechanism 1.

In operation, the shaft 27 is rotated by a motor 69 that is mounted in the lower compartment 51, and transmits power through gears 70 and 71, worm gears 101 and 102, universal joint 80, coupling 71′, intermediate shaft 78, universal joint 79, shaft 72 and bevel gears 73 and 74. The shaft 72 extends through the bottom plate 75 of the upper compartment 5 containing the tap-changing mechanism 1, and, in order to prevent leakage of oil through the passageway, a stuffing box 76 is provided in the bottom plate 75 around the shaft 72. The shaft 72 comprises a coupling link 78 for adjusting its length, and extends between the universal joints 79 and 80 that are provided to assist in "lining up" the shafts within the upper and lower compartments.

The cam-operated switching mechanism 1 is completely enclosed in an oil-tight housing 82 that is secured, by bolts 81, to a frame 81' extending from the transformer tank wall 3. The casing 82 for the tap-changing switch mechanism contains sufficient oil 83, so that all of the switches 19 and the cam-operated mechanism are completely immersed.

Such oil is preferably separated from that used in the main transformer casing because the latter is used mainly for cooling and insulating purposes and must be maintained at a high dielectric strength, whereas the oil 83 in the switching compartment 82 is used to quench the arcs caused by the opening of the switches 19 and, therefore, deteriorates. The oil 83 in the compartment 82 also serves, to a slight extent, to lubricate the cams and switching mechanism, and to prevent rusting of the equipment immersed in such oil which was not possible in previous types of tap changers.

A micarta relief diaphragm 84 is provided in the upper part of the casing 5 to take care of any excessive pressures that might develop under abnormal conditions, such as a short circuit occurring at the time of a tap change. An exhaust pipe 85 is also provided in the upper part of the casing 5 above the level of the oil to take care of minor abnormal pressures developed by gases that are generated by the arcing of the contacts of the switches 19.

The switches 19 are mounted on the ends of the condenser bushings that are, in turn, mounted in a flange on the side of the transformer tank. By such construction, a relatively short connection is made possible for the conductors from the bushings to the auto-transformer 14 that is mounted directly on the core 6 of the main transformer and for the conductors to the main winding 10. It is to be noted that there is no inter-change of oil between the transformer tank 4 and the switching mechanism tank 5. This is necessary because the high dielectric strength of the oil in the main transformer must be maintained, as hereinbefore mentioned.

The lower tank 5' that houses the control mechanism 2 for turning the cam shaft 27 is mounted directly below the switching mechanism 1 on the side 3 of the transformer tank 4. The mechanism 2 may be automatically operated by the motor 69 and is also arranged for remote control under the direction of an operator, as well as for hand operation.

Fig. 5 shows the schematic arrangement of the high-voltage winding 10 and its relation to the preventive auto-transformer 14 and switches 19. The switches 19 are cam operated in a desired sequence to connect the preventive auto-transformer 14 to the various transformer taps. With such relation of the conductor 18 to the auto-transformer 14, and the high-voltage winding 10, the voltage between conductors 17 and 18 may be varied in steps corresponding to the tap voltages, or to a voltage midway between adjacent taps.

In changing from one voltage position to another, only one operation is required, namely, the opening or closing of a switch. For such operation, the switches 19 are designed to operate in proper sequence. The contact members 55 and 57 of the switches 19 separate by the action of the springs 62, when the cams 30 on the cam operating mechanism push the toggles past their center positions.

In case any of the contacts have a tendency to stick, the cam 30 continues to actuate the toggle and force the contact open. The second set of cams 31 on the cam operating mechanism pull the toggles over their center positions in the opposite direction and aid in holding the switches closed.

In order to stop the operation of the mechanism on a tap position and to prevent its operation beyond either of the extreme tap positions, cam operating limit switches 86 are provided in the lower part of the tap-changing mechanism, as shown in Fig. 1. These switches are supplemented by a mechanical stop, not shown, to prevent over-travel in case of failure of the limit switches 86 or when hand operation is used.

Figure 6:
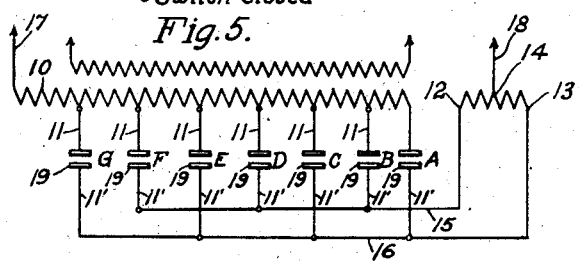
Fig. 6 is a sequence chart of operation for the switches shown in Fig. 5.

The cams on the shaft 27 are arranged to open and close the switches 19 in the sequence indicated in the chart shown in Fig. 6 of the drawings which is believed to be self explanatory.

While I have shown my apparatus in connection with, and mounted on, a single-phase transformer, it will be apparent to those skilled in the art that my invention is equally applicable to three-phase or other polyphase as well as single-phase transformers and to star or delta-connected windings or a combination of the same.

Various changes and modifications may be made in my invention without departing from the spirit and scope thereof, as set forth in the appended claims.

I claim as my invention:

1. The combination with a transformer having a winding provided with taps and an oil filled tank therefor having an opening therein, of equipment for changing the connections of said taps while the transformer is operating under load, comprising a plate mounted on the wall of said tank over the opening therein, a plurality of condenser bushings mounted in openings in said plate, said condenser bushings being disposed in pairs, a plurality of switches having co-operating contact members mounted on the associated bushings of each of said pairs of bushings, cam-operated mechanism for operating said switches in a predetermined se quence and a chamber adapted to contain oil, for housing said switches, and cam-operated mechanism.

2. The combination with electrical apparatus having a winding provided with taps, an enclosed tank for containing an insulating and cooling fluid for said electrical apparatus, of equipment for changing the connections of said taps comprising a plurality of terminal bushings mounted in the wall of said tank and arranged in pairs, switches mounted on coacting pairs of said terminal bushings for controlling circuits to said taps, and means for maintaining said switches immersed in oil.

3. The combination with electrical apparatus comprising a winding having taps, a tank for containing said electrical apparatus, of equipment for changing the connections of said taps comprising a pair of terminal bushings for each tap mounted on the wall of said tank, and means for connecting and disconnecting the terminals of said pairs of terminal bushings in electrical circuit relation in a predetermined sequence.

4. The combination with electrical apparatus comprising a winding having taps, a tank for containing said electrical apparatus, of equipment for controlling circuits to said taps comprising a pair of terminal bushings for each tap mounted on the wall of said tank, switches mounted on each pair of said bushings for connecting and disconnecting pairs of the terminals of said bushings, and means for operating said switches in a predetermined sequence.

5. The combination with electrical apparatus having a winding, and a plurality of taps on said winding, of a casing enclosing said apparatus, a plurality of condenser bushings mounted in the wall of said casing to insulate and support terminals for said taps, switches mounted on pairs of said bushings, arcing barriers disposed between said pairs of switches, and means for immersing said switches in an arc-quenching medium.

6. In combination, an electrical transformer winding having a plurality of taps, apparatus for electrically connecting and disconnecting said taps in predetermined sequence, said apparatus comprising switches, and means for opening and closing said switches, said means including cams for forcing said switches open in the event of any tendency in them to remain closed.

In testimony whereof, I have hereunto subscribed my name this fifteenth day of June, 1928.

LELAND H. HILL.